United States Patent
Cho et al.

(10) Patent No.: US 7,337,263 B2
(45) Date of Patent: Feb. 26, 2008

(54) METHOD OF VARYING RECORDING DENSITY OF DATA STORAGE MEDIUM AND DISK DRIVE USING THE METHOD

(75) Inventors: Sung-youn Cho, Suwon-si (KR); Seung-youl Jeong, Hwaseong-si (KR); Jong-lak Park, Suwon-si (KR)

(73) Assignee: Samsung Electrionics Co., Ltd., Suwon-Si (KR)

( * ) Notice: Subject to any disclaimer, the term of this patent is extended or adjusted under 35 U.S.C. 154(b) by 267 days.

(21) Appl. No.: 11/269,571

(22) Filed: Nov. 9, 2005

(65) Prior Publication Data
US 2006/0101198 A1    May 11, 2006

(30) Foreign Application Priority Data
Nov. 9, 2004    (KR) .................... 10-2004-0090782

(51) Int. Cl.
*G06F 13/00* (2006.01)
(52) U.S. Cl. .................... 711/4; 369/13.09; 369/13.38
(58) Field of Classification Search .................... 711/4; 369/13.09, 13.38
See application file for complete search history.

(56) References Cited

U.S. PATENT DOCUMENTS

| 5,903,404 A * | 5/1999 | Tsurumi et al. ............... 360/48 |
| 5,937,435 A * | 8/1999 | Dobbek et al. ............. 711/202 |
| 5,991,197 A * | 11/1999 | Ogura et al. ........... 365/185.11 |
| 2007/0025006 A1 * | 2/2007 | Ichihara ..................... 360/31 |

FOREIGN PATENT DOCUMENTS

| JP | 09-035359 | 2/1997 |
| JP | 2000-353320 | 12/2000 |
| JP | 2001-076435 | 3/2001 |

* cited by examiner

Primary Examiner—Reba I. Elmore
(74) Attorney, Agent, or Firm—Staas & Halsey LLP

(57) ABSTRACT

A method of and apparatus for varying a recording density of a data storage system. The method includes setting a range of a region whose recording density is to be changed, judging whether a region in which data read and write commands are to be executed is within the set range, and performing data read and write operations by allocating only one data among a plurality of continuous tracks as a data track if the region in which the data read and write commands are to be executed is within the set range.

15 Claims, 5 Drawing Sheets

METHOD OF VARYING RECORDING DENSITY OF DATA STORAGE MEDIUM AND DISK DRIVE USING THE METHOD

CROSS-REFERENCE TO RELATED APPLICATION

This application claims the priority of Korean Patent Application No. 2004-0090782, filed on Nov. 9, 2004, in the Korean Intellectual Property Office, the disclosure of which is incorporated herein in its entirety by reference.

BACKGROUND OF THE INVENTION

1. Field of the Invention

The present invention relates to a method of and apparatus for changing a recording density of a data storage system, and more particularly, to a method of varying a recording density of a data storage medium such that a user can easily change a recording density of a recording medium without changing a manufacturing process, and a disk drive using the method.

2. Description of Related Art

In general, hard disk drives (HDDs), which are data storage devices, contribute to the operation of a computer system by reading data written on a disk or writing data on the disk using a magnetic head. In line with a recent trend toward high capacity, high density, and compact devices, bits per inch (BPI), which are a measure of a recording density in a disk rotating direction, and tracks per inch (TPI), which are a measure of a recording density in a disk diameter direction, have increased. Accordingly, HDDs are required to have more delicate mechanisms.

Systems employing HDDs suffer a phenomenon that a specific region (e.g., a file allocation table (FAT)) of a disk in the HDDs is repeatedly accessed. In this case, when data is written on the specific region, the specific region is excessively magnetized, and thus data stored in regions adjacent to the specific region may be erased. If data in an important region such as the FAT are erased, it can cause serious problems in using the systems.

To solve the problems, a conventional method reduces a recording density of a predetermined region of a disk in a disk drive by changing a manufacturing process.

However, the conventional method still has a problem in that since the recording density of the disk is fixed in a manufacturing process, a user cannot freely designate a specific region according to use and cannot reduce a recording density of the specific region.

BRIEF SUMMARY

An aspect of the present invention provides a method of varying a recording density of a data storage medium such that a user can designate a specific region of a recording medium and reduce a recording density of the specific region without changing a manufacturing process, and a disk drive using the method.

According to an aspect of the present invention, there is provided a method of varying a recording density of a data storage system, the method including: setting a range of a region whose recording density is to be changed; judging whether a region in which data read and write commands are to be executed is within the set range; and performing data read and write operations by allocating only one track among a plurality of continuous tracks as a data track when the region in which the data read and write command are to be executed is within the set range.

According to another aspect of the present invention, there is provided a data storage disk drive including: a host interface receiving and transmitting data from and to a host device; a disk storing information; a controller controlling to set a range of a region whose recording density is to be changed according to a recording density change command and region information transmitted from a host device, and perform data read and write operations by allocating only one track among a plurality of continuous tracks of the disk as a data track when a region in which data read and write commands are to be executed is located within the set range of the region; and a write/read circuit processing a signal for writing information on the disk or reading information from the disk.

According to another aspect of the present invention, there is provided a method of setting a region the recording density of which is reducible in a storage medium, including: receiving a recording density change command and region information including a start logic block address (LBA) and an end LBA defining the region; writing the start LBA and the end LBA on a maintenance cylinder of the storage medium; adjusting a physical address and LBA of the region so that adjacent plural tracks in the region are combined into a data track; and changing a maximum LBA value of the region to a value obtained by subtracting a half of a difference between the start LBA and the end LBA from an initial writable maximum LBA of the region.

According to another aspect of the present invention, there is provided a method of writing data on a storage medium, including: reading a start logic block address (LBA) and an end LBA of a region of the storage medium, a recording density of the region being changeable, when a write command including an LBA is received; determining whether the received LBA is located between the start LBA and the end LBA; changing the received LBA of the received write command so that plural adjacent tracks in the region are combined into a data track, when the received LBA is located between the start LBA and the end LBA; converting the changed LBA into a physical address; seeking a target track corresponding to the physical address; and writing data to the storage medium at the target track.

According to another aspect of the present invention, there is provided a method of writing data on a storage medium, including: reading region information including a start logic block address (LBA) and an end LBA of a region of the storage medium, a recording density of the region being changeable, when a write command including an LBA defining a write region is received; determining whether the received LBA is located between the start LBA and the end LBA; reducing the recording density of the write region by combining plural adjacent tracks in the write region into a data track, when the received LBA is located between the start LBA and the end LBA; and converting the changed LBA into a physical address and writing the data at a target track of the storage medium corresponding to the physical address.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Figure 1:
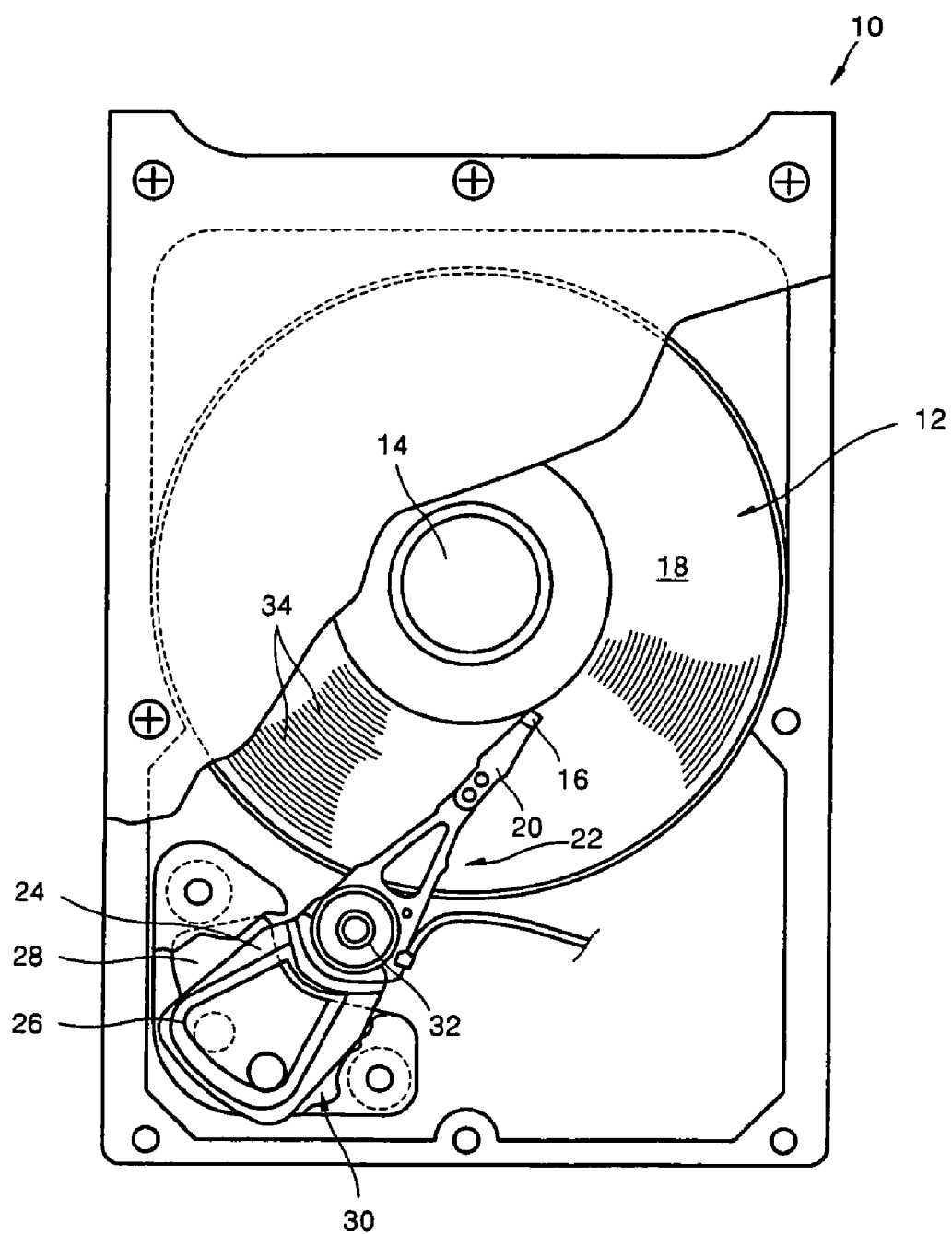
FIG. 1 is a top view of a hard disk drive (HDD) to which an embodiment of the present invention is applied.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a top view of a hard disk drive (HDD) 10 to which an embodiment of the present invention is applied. The HDD 10 includes at least one magnetic disk 12 that is rotated by a spindle motor 14. The disk drive 10 further includes a transducer 16 located adjacent to a disk surface 18.

The transducer 16 can read or write information on each rotating disk 12 by detecting a magnetic field of the disk 12 and magnetizing the disk 12. The transducer 16 is generally associated with the disk surface 18. Although the transducer 16 is shown as one body, it is to be understood that the transducer 16 includes of a write transducer for magnetizing the disk 12 and a separate read transducer for detecting a magnetic field of the disk 12. The read transducer consists of a magneto-resistive element. The transducer 16 is generally referred to as a head.

The transducer 16 can be combined with a slider 20. The slider 20 is structured to generate an air bearing between the transducer 16 and the disk surface 18. The slider 20 is incorporated into a head gimbal assembly 22. The head gimbal assembly 22 is attached to an actuator arm 24 having a voice coil 26. The voice coil 26 is located adjacent to a magnetic assembly 28 to define a voice coil motor (VCM) 30. Current supplied to the voice coil 26 generates torque for rotating the actuator arm 24 relative to a bearing assembly 32. The rotation of the actuator arm 24 causes the transducer 16 to move across the disk surface 18.

Information is typically stored in annular tracks of the disk 12. Each track 34 generally includes a plurality of sectors. Each sector consists of a data field and an identification field. The identification field includes a gray code that identifies the sector and the track (cylinder). The transducer 16 moves across the disk surface 18 to read or write information on other track.

Figure 2:
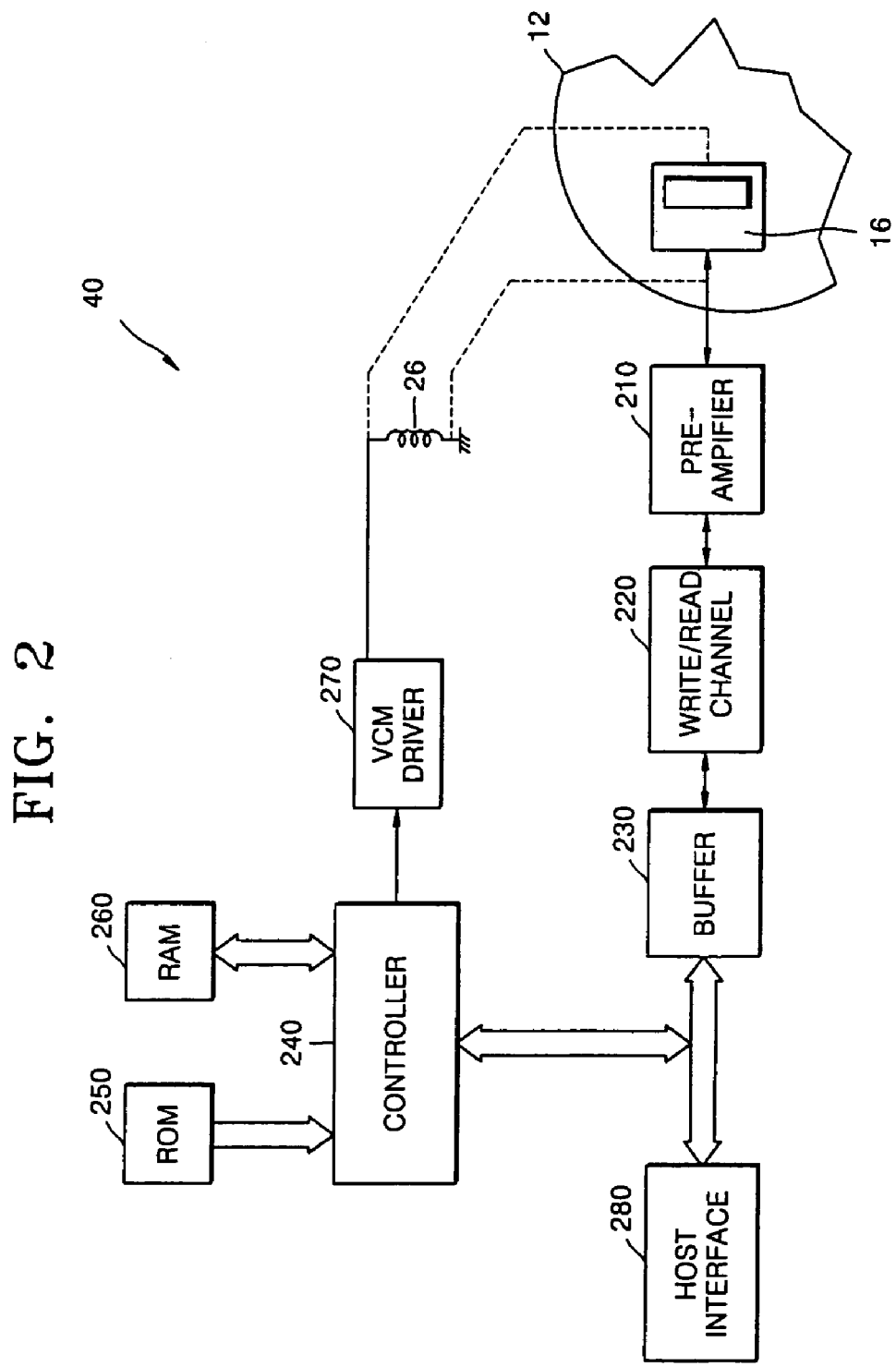
FIG. 2 is a block diagram illustrating an electrical circuit configuration of a disk drive according to an embodiment of the present invention.

FIG. 2 is a block diagram illustrating an electrical circuit configuration of a disk drive according to an embodiment of the present invention. Referring to FIG. 2, the disk drive includes a disk 12, a transducer 16, a pre-amplifier 210, a write/read channel 220, a buffer 230, a controller 240, a read-only memory (ROM) 250, a random access memory (RAM) 260, a voice coil motor driving unit 270, and a host interface 280.

A circuit including the pre-amplifier 210 and the write/read channel 220 is referred to herein as a write/read circuit.

Various programs and data for controlling the disk drive are stored in the ROM 250, and data necessary for operation of the disk drive read from a maintenance cylinder of the disk 12 every booting are loaded in the RAM 260. Further, region information including start logic block address (LBA) information and end LBA information received together with a recording density change command from a host device (not shown) is also loaded in the RAM 260.

Data received from the host device through the host interface 280 in a write mode are sequentially stored in the buffer 230, and data read from the disk 12 in a read mode are sequentially stored in the buffer 230.

An amplification circuit for amplifying a signal detected by the transducer 16, a read current control circuit for supplying a read current to the transducer 16 according to an optimal read channel parameter value, and a write current control circuit for supplying a write current to the transducer 16 according to temperature are embedded in the pre-amplifier 210.

The operation of the disk drive will be explained herein below with reference to FIGS. 1 and 2.

In a data read mode, the disk drive amplifies an analog electrical signal detected by the transducer 16 (i.e., head) from the disk 12 using the pre-amplifier 210 so that the electrical signal can be easily processed. Thereafter, the disk drive encodes the amplified analog signal into a digital signal by the write/read channel 220 so that the host device can read the digital signal, converts the digital signal into stream data, temporarily stores the stream data in the buffer 230, and then transfers the stored stream data to the host device through the host interface 280.

In a data write mode, the disk drive receives data from the host device through the host interface 280, temporarily stores the data in the buffer 230, outputs the data from the buffer 230, converts the output data into a binary data stream suitable for a write channel by means of the write/read channel 220, and writes the data using a write current amplified by the pre-amplifier 210 on the disk 12 through the transducer 16.

The controller 240 controls the disk drive to analyze a command received through the host interface 280 and execute the command.

Accordingly, the controller 240 controls the disk drive to set a region whose recording density is to be changed using region information, which includes start LBA information and end LBA information, received together with a recording density change command, and perform data read and write operations by allocating one track among a plurality of continuous tracks of the disk 12 as a data track if a region with an LBA in which data read and write commands are to be executed is within the set region whose recording density is to be changed.

Figure 5:
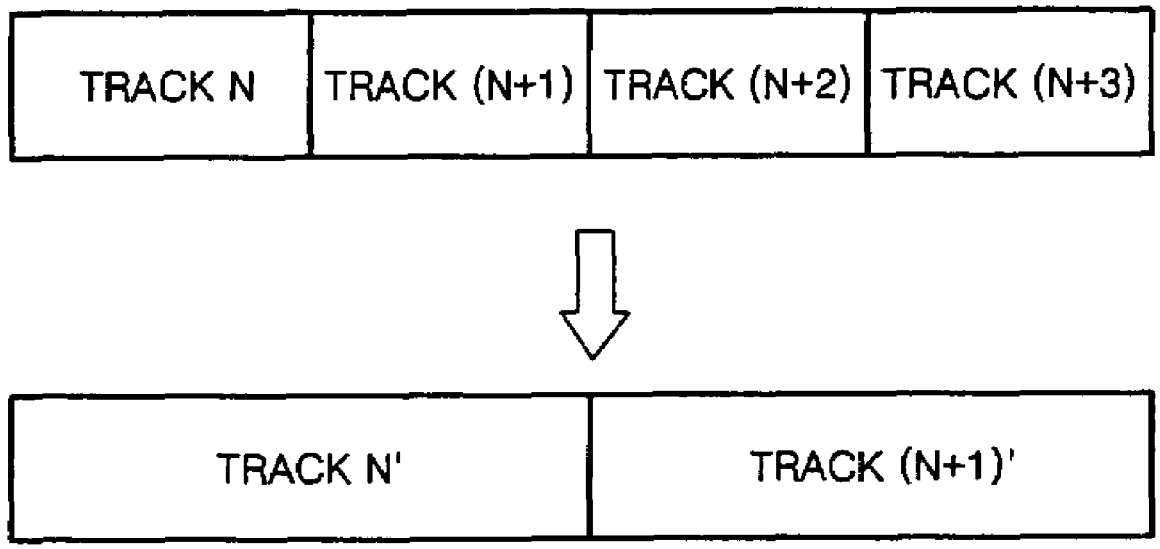
FIG. 5 is a diagram illustrating tracks of a disk for explaining a way of changing a recording density according to an embodiment of the present invention.

According to the present embodiment, a recording density is reduced by allocating (i.e., combining) one track of two adjacent tracks as a data track as shown in FIG. 5. However, it is to be understood that the present embodiment is not limited to this example. Thus, by way of a non-limiting example, a recording density can be reduced by allocating one track among three or more tracks as a data track.

The controller 240 is also coupled to the VCM driving unit 270 that supplies a driving current to the voice coil 26, and provides a control signal to the VCM driving unit 270 to control excitement of the VCM 30 and movement of the transducer 16.

A method of varying a recording density of a data storage medium according to an embodiment of the present invention will now be explained with reference to flowcharts of FIGS. 3 and 4

Figure 3:
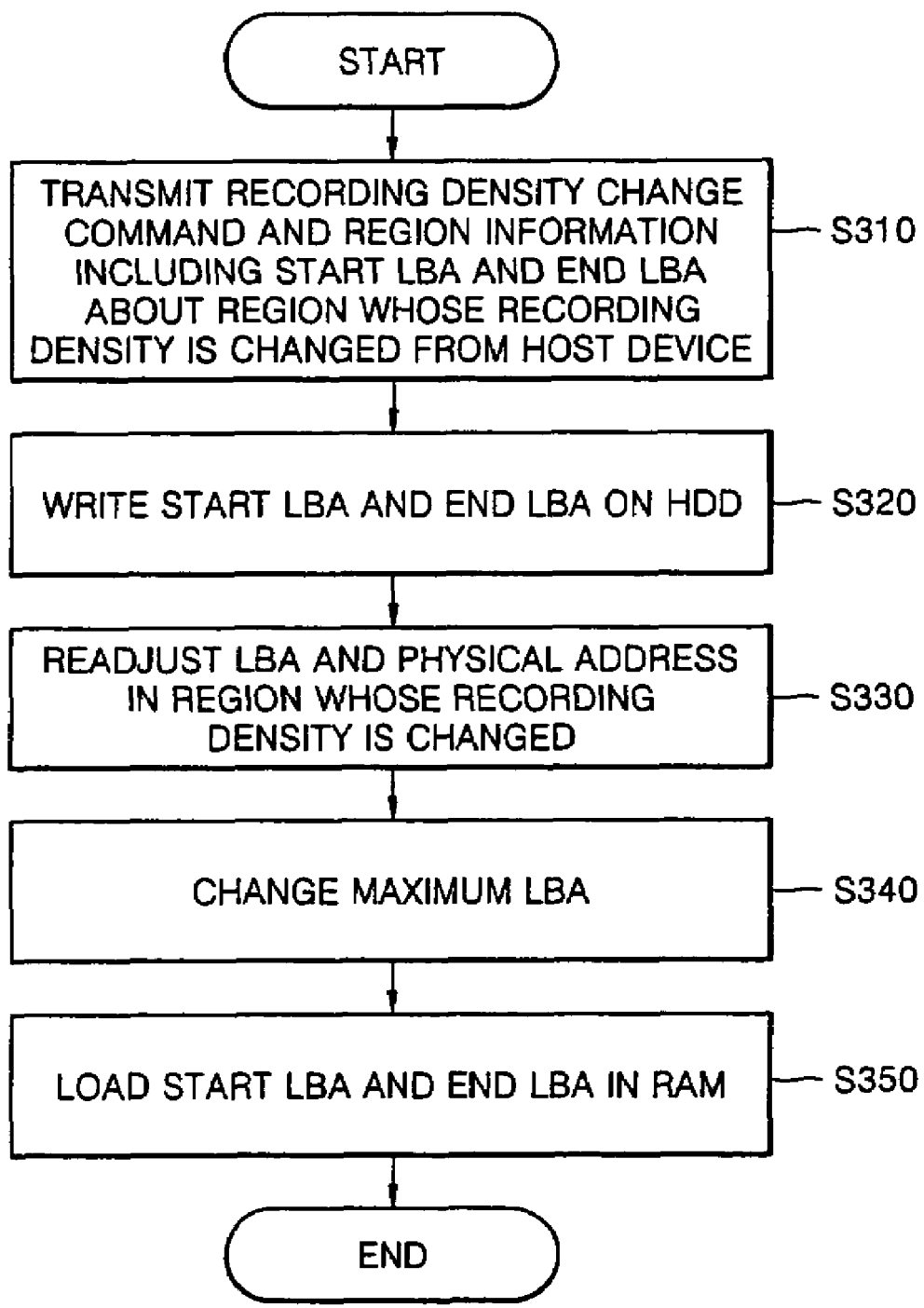
FIG. 3 is a flowchart of a method of setting a region whose recording density is to be changed in a data storage medium according to an embodiment of the present invention.
Figure 4:
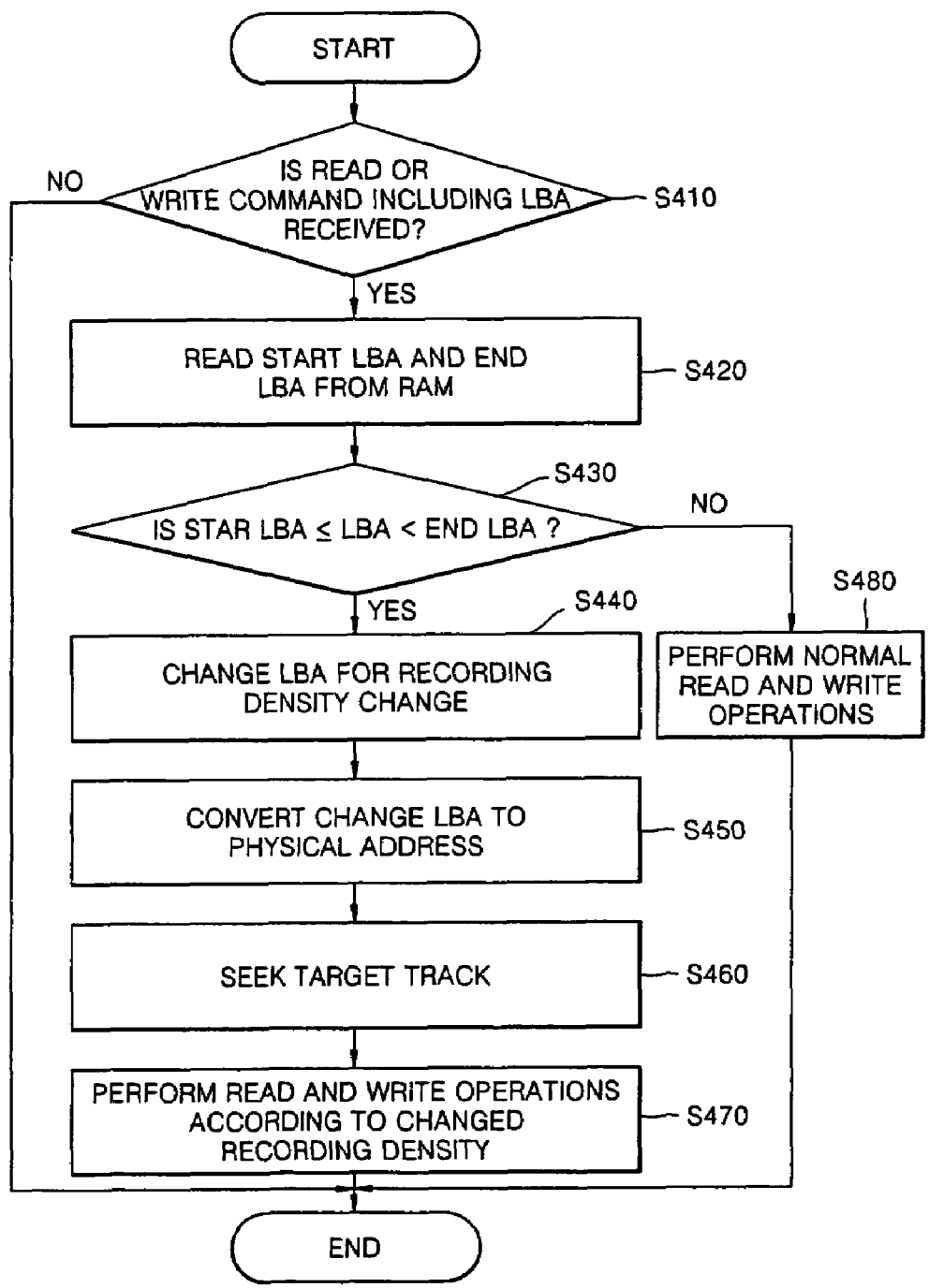
FIG. 4 is a flowchart of a method of varying a recording density of the data storage medium according to an embodiment of the present invention.

FIG. 3 is a flowchart of a method of setting a region whose recording density is to be changed in a data storage medium according to an embodiment of the present invention. FIG. 4 is a flowchart of a method of performing data write and read operations by varying a recording density of the data storage medium according to an embodiment of the present invention.

First, a method of setting a region for varying a recording density of a data storage medium according to an embodiment of the present invention will be explained based on the flowchart of FIG. 3 with reference to the configuration of the disk drive of FIG. 2.

To change a recording density of a specific region in the HDD, in operation S310, a recording density change command specified by the host device is transmitted to the disk drive together with region information, which includes a start LBA and an end LBA, about a region whose recording density is to be changed.

If the recording density change command is transmitted to the controller 240 of the HDD through the host interface 280, in operation S320, the controller controls the HDD to write the start LBA information and the end LBA information received together with the recording density change command on a maintenance cylinder of the disk 12.

Thereafter, in operation S330, the controller 240 adjusts a physical address corresponding to an LBA so that one track of two continuous tracks in the region whose recording density is to be changed are allocated (i.e., combined) as a data track.

Next, in operation S340, the controller 240 changes a maximum LBA value to a value obtained by subtracting a half of a difference between the start LBA and the end LBA included in the region information from an initially set writable maximum LBA.

For example, if a start LBA of the region whose recording density is to be changed is 10000 and an end LBA of the region whose recording density is to be changed is 20000, a range from the LBA 10000 to the LBA 20000 before a recording density change is changed to a range from an LBA 10000 to an LBA 15000 by uniting two tracks in the pertinent region into one track according to the recording density change command. Also, a writable maximum LBA value is changed to a maximum LBA value–5000.

Next, the controller 240 loads the start LBA and the end LBA of the region whose recording density is to be changed in the RAM 260.

Through the aforementioned process, a user can designate a specific region of the disk drive to reduce a recording density of the disk partially or wholly.

Next, a method of performing data write and read operations by varying a recording density of the specific region of the data storage medium will be explained based on the flowchart of FIG. 4 with reference to the configuration of the disk drive of FIG. 2.

In operation S410, the controller 240 judges whether a read command or a write command is received from the host device through the host interface 280. If it is judged in operation S410 that the read command or the write command is not received, the process ends.

If it is judged in operation S410 that the read command or the write command is received, the process goes to operation S420. In operation S420, the controller 2470 reads from the RAM 260 the start LBA and the end LBA included in the region information about the region whose recording density is to be changed.

Thereafter, in operation S430, the controller 240 judges whether an LBA received together with the read command or the write command is located between the start LBA and the end LBA.

If it is judged in operation S430 that the LBA received together with the read command and the write command is located between the start LBA and the end LBA, the process goes to operation S440. In operation S440, the controller 240 changes the LBA so that one track of two tracks can be allocated as a data track as shown in FIG. 5. In operation S450, the controller 240 converts the changed LBA into a physical address.

In operation S460, the controller 240 seeks a target track corresponding to the value of the physical address obtained in operation S450. In operation S470, the controller 240 controls the HDD to read or write data from or to the disk 120 according to a recording density reduced to a half.

However, if it is judged in operation S430 that the LBA received together with the read command or the write command is not located between the start LBA and the end LBA, the process goes to operation S480. In operation S480, the controller 240 controls the HDD to perform normal data read and write operations without changing a recording density.

According to the above-described embodiments, since a user can reduce a recording density by designating a specific region of the disk of the disk drive, data are prevented from being erased due to repeated write operations in adjacent tracks.

The above-described embodiments of the present invention may be accomplished by a method, an apparatus, and a system. If it is performed by software, constitutional elements are code segments that perform essential operations. Programs or code segments can be stored in processor-readable media, and can be sent by computer data signals combined with carrier waves via transmission media or communication networks. The processor readable media include any media that can store or transmit information. Examples of the processor readable media are electronic circuits, semiconductor memory devices, read-only memories (ROMs), erasable ROMs, floppy disks, optical disks, hard disks, optical fiber media, and radio frequency (RF) networks. The computer data signals include any signals that can be transmitted over transmission media, such as electronic network channels, optical fibers, air, electronic systems, and RF networks.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of varying a recording density of a data storage system, the method comprising:

setting a range of a region whose recording density is to be changed;

judging whether a region in which data read and write commands are to be executed is within the set range; and performing data read and write operations by allocating only one track among a plurality of continuous tracks as a data track when the region in which the data read and write command are to be executed is within the set range.

2. The method of claim 1, wherein the plurality of tracks is two tracks, and one track of the two tracks is allocated as a data track.

3. The method of claim 1, wherein the region whose recording density is to be changed is determined by designating a start logic block address and an end logic block address through a host device.

4. The method of claim 1, wherein the setting of the range of the region includes:
  receiving a predetermined recording density change command and region information from a host device and writing the region information;
  adjusting a logic block address and a physical address so that one track among two continuous tracks in the region whose recording density is to be changed is allocated as a data track; and
  changing a maximum logic block address value to a value obtained by subtracting a half of a range of the logic block address included in the region information from an initially set writable maximum logic block address.

5. The method of claim 4, further comprising loading the region information in a random access memory.

6. A data storage disk drive comprising:
  a host interface receiving and transmitting data from and to a host device;
  a disk storing information;
  a controller setting a range of a region whose recording density is to be changed according to a recording density change command and region information transmitted from a host device, and performing data read and write operations by allocating only one track among a plurality of continuous tracks of the disk as a data track if a region in which data read and write commands are to be executed is located within the set range of the region; and
  a write/read circuit processing a signal for writing information on the disk or reading information from the disk.

7. The disk drive of claim 6, wherein the plurality of tracks is two tracks, and one track of the two tracks is allocated as a data track.

8. The disk drive of claim 6, wherein the region information includes a start logic block address and an end logic block address.

9. The disk drive of claim 6, wherein the controller adjusts a logic address and a physical address so that one track among the plurality of continuous tracks in the region whose recording density is to be changed can be allocated as a data track, and changes a maximum block address value to a value obtained by subtracting a half of a difference between a start logic block address and an end logic block address included in the region information from an initially set writable maximum logic block address.

10. A method of setting a region the recording density of which is reducible in a storage medium, comprising:

receiving a recording density change command and region information including a start logic block address (LBA) and an end LBA defining the region;
writing the start LBA and the end LBA on a maintenance cylinder of the storage medium;
adjusting a physical address and LBA of the region so that adjacent plural tracks in the region are combined into a data track; and
changing a maximum LBA value of the region to a value obtained by subtracting a half of a difference between the start LBA and the end LBA from an initial writable maximum LBA of the region.

11. A method of writing data on a storage medium, comprising:
  reading a start logic block address (LBA) and an end LBA of a region of the storage medium, a recording density of the region being changeable, when a write command including an LBA is received;
  determining whether the received LBA is located between the start LBA and the end LBA;
  changing the received LBA of the received write command so that plural adjacent tracks in the region are combined into a data track, when the received LBA is located between the start LBA and the end LBA;
  converting the changed LBA into a physical address;
  seeking a target track corresponding to the physical address; and
  writing data to the storage medium at the target track.

12. The method of claim 11, wherein, in the changing, a pair of tracks is combined into a data track so that the recording density of the region is reduced by a half.

13. The method of claim 11, wherein, in the changing, three tracks are combined into a data track so that the recording density of the region is reduced by one third.

14. The method of claim 11, further comprising writing without changing the received LBA when the received LBA is not between the start LBA and the end LBA.

15. A method of writing data on a storage medium, comprising:
  reading region information including a start logic block address (LBA) and an end LBA of a region of the storage medium, a recording density of the region being changeable, when a write command including an LBA defining a write region is received;
  determining whether the received LBA is located between the start LBA and the end LBA;
  reducing the recording density of the write region by combining plural adjacent tracks in the write region into a data track, when the received LBA is located between the start LBA and the end LBA; and
  converting the changed LBA into a physical address and writing the data at a target track of the storage medium corresponding to the physical address.

* * * * *